United States Patent

Kobori

Patent Number: 5,309,051
Date of Patent: May 3, 1994

[54] STEPPING MOTOR WITH DETENT TORQUE ELIMINATION

[75] Inventor: Masaru Kobori, Kashiwa, Japan

[73] Assignee: Oriental Motor Kabushiki Kaisha, Tokyo, Japan

[21] Appl. No.: 21,988

[22] Filed: Feb. 24, 1993

[30] Foreign Application Priority Data

Jun. 24, 1992 [JP] Japan .................. 4-190065

[51] Int. Cl.⁵ .................. H02K 37/00; H02K 1/12
[52] U.S. Cl. .................. 310/49 R; 310/257
[58] Field of Search .................. 310/49 R, 162, 163, 310/164, 257, 263, 269, 185, 187

[56] References Cited

U.S. PATENT DOCUMENTS 4,910,475  3/1990  Lin .................. 310/49 R
4,992,686  2/1991  Heine et al. .................. 310/49 R

FOREIGN PATENT DOCUMENTS 3-212149  9/1991  Japan .

Primary Examiner—Steven L. Stephan
Assistant Examiner—E. To
Attorney, Agent, or Firm—McAulay Fisher Nissen Goldberg & Kiel

[57] ABSTRACT

A stepping motor forms the teeth of the stator so that each have a predetermined pitch in order to eliminate the detent torque. In a stepping motor in which P stator salient poles $1_1, 1_2, \ldots 1_p$ are disposed and, on the surface of each stator salient pole opposed to a rotor 2 whose teeth 4 are disposed at equal pitches $\tau_R$, k stator teeth 3 are each disposed at equal pitches $\tau_S$. The stator salient poles $1_1, 1_2, \ldots 1_p$ comprise n sets of poles each differing in phase. The stator teeth 3 are disposed so that their pitch $\tau_S = \tau_R \times \{1 \pm 1/(n \times k)\}$.

6 Claims, 6 Drawing Sheets $\tau_S = \tau_R = 7.2°$ $\tau_S = \tau_R = 7.2°$

THE NUMBER OF SALIENT POLES : P

THE NUMBER OF TEETH : K $n = 4$
$k = 5$
$\tau_R = 7.2°$ $n = 5$
$k = 4$
$\tau_R = 7.2°$ $n = 4$
$k = 6$
$\tau_R = 7.2°$ $n = 6$
$k = 4$
$\tau_R = 7.2°$ $\tau_S \neq \tau_R$

STEPPING MOTOR WITH DETENT TORQUE ELIMINATION

BACKGROUND OF THE INVENTION a) Field of the Invention

The present invention relates to a stepping motor and, in particular, to a stepping motor in which the detent torque is eliminated or reduced while the driving torque is increased.

Here, by the detent torque is meant a torque which, even when the motor is not excited, intends to retain a predetermined position, and it essentially differs from the holding torque generating when a specific phase or phases are excited with the motor electrically turned on, that is, the holding torque represented in terms of stiffness characteristics.

b) Background Prior Art

Conventionally, as this type of stepping motor, there has been available one shown in a cross-sectional view of FIG. 6 which represents the mutual relationship between the stator and the rotor.

FIG. 6 illustrates an example of a two phase stepping motor, in which eight salient poles $1_1, 1_2, 1_3, \ldots, 1_7$ and $1_8$ are disposed at equal pitch angles at the side of a stator 1 while five teeth 3 are each disposed at equal pitches of $\tau_S = 7.5$ degrees on the surface of each stator pole opposed to a rotor 2, and also on the outer circumference of the rotor 2, a plurality of, for example, fifty rotor teeth 4 are each disposed at equal pitch angles of $\tau_R = 7.2$ degrees. Incidentally, reference numeral 5 of FIG. 6 denotes a winding of the stator pole, and 6 an output shaft of the rotor 2.

In FIG. 6, in an attempt to reduce the detent torque of the stepping motor, the pitch $\tau_S$ of the teeth 3 at the side of the stator 1 and the pitch $\tau_R$ of the teeth 4 at the side of the rotor 2 are not set equal.

However, in such a conventional stepping motor, since the cycle of the detent torque of the motor is not systematically considered in determining the pitch $\tau_S$ of the teeth 3 at the side of the stator 1, the detent torque has not been fully reduced.

SUMMARY OF THE INVENTION

In view of the foregoing circumstances, the present invention was conceived, and its primary object is to eliminate the foregoing problem and provide a stepping motor in which the cycle of the detent torque is evaluated from the entire arrangement of the stepping motor, and thereafter a pitch of the teeth of the stator is selected to eliminate this cycle.

In order to achieve the foregoing end, the present invention provides a stepping motor in which P salient poles of the stator are each disposed, and on the surface of each salient pole of the stator, which is opposed to the rotor whose teeth are disposed at equal pitches $\tau_R$, k teeth of the stator are each disposed at equal pitches $\tau_S$ in which:

(1) When the foregoing salient poles of the stator comprise n sets of salient poles each different in phase, the teeth of the stator are each disposed so that $\tau_S = \tau_R \times \{1 \pm 1/(n \times k)\}$ to thereby eliminate the detent torque.

(2) When the stepping motor as described in (1) is a two phase motor with P=8 salient poles of the stator, n=4 sets of salient poles, k=5 teeth for each salient pole and the pitch ($\tau_R$) of 7.2 degree of the rotor, the pitch $\tau_S$ of the teeth of the stator is within the range of 7.532 to 7.588 degrees.

(3) When the stepping motor of (1) is a five phase with P=10 salient poles of the stator and n=5 sets of the salient poles of the stator, k=4 teeth for each salient pole and the pitch ($\tau_R$) of 7.2 degrees of the rotor, the pitch $\tau_S$ of the stator is within the range of 7.544 to 7.576 degrees.

(4) The teeth of the stator as described in (1) are disposed so that their pitch $\tau_S = \tau_R \times \{1 - 1/(n \times k)\}$ to increase the number of the teeth for each salient pole to increase the driving torque.

(5) When the stepping motor of (4) is a two phase with P=8 salient poles of the stator, n=4 sets of the salient poles, k=6 teeth for each pole and the pitch ($\tau_R$) of 7.2 degrees of the rotor teeth, the pitch $\tau_S$ of 7.2 degrees of the rotor teeth is within the range of 6.887 to 6.913 degrees.

(6) When the stepping motor of (4) is a three phase motor with P=12 salient poles of the stator, n=6 sets of the salient poles, k=4 teeth for each salient pole and the pitch $\tau_R$ of 7.2 degrees of the rotor teeth, the pitch $\tau_S$ of the stator is within the range of 6.887 to 6.913 degrees.

Since the present invention is arranged as in the foregoing, the detent torque of the stepping motor can be eliminated.

How the detent torque of the stepping motor is eliminated is hereinafter described.

FIG. 1 is a cross-sectional view revealing the relationship between the stator and the rotor, which serves to evaluate the cycle of the detent torque of the stepping motor, and the same members as in FIG. 6 are each assigned with the same numeral for the sake of simplifying the description.

In FIG. 1, the pitch $\tau_S$ of the stator teeth and the pitch $\tau_R$ of the rotor teeth are equal to each other, and $\tau_S = \tau_R = 7.2$ degrees.

The detent torque generating at each salient pole $1_1, 1_2, \ldots, 1_8$ exhibits a complicated waveform comprising a fundamental wave of the same cycle as the pitch $\tau_R$ of the rotor teeth 4 and its higher harmonic wave. Since the arrangements of the stator teeth 3 of each salient pole $1_1, 1_2, \ldots, 1_8$ are the same, their waveform becomes the same for any salient pole, and only their phase corresponds to a difference between the salient poles. Their phase difference is caused by the phase difference between the stator teeth 3 and the rotor teeth 4.

Referring to FIG. 1, with the salient pole $1_1$ taken as the reference, the electrical phase difference between each salient pole becomes as follows:

salient pole $1_1 \ldots 0$,
salient pole $1_2 \ldots \pi/4$,
salient pole $1_3 \ldots 2\pi/4$,
salient pole $1_4 \ldots 3\pi/4$,
salient pole $1_5 \ldots 0$,
salient pole $1_6 \ldots \pi/4$,
salient pole $1_7 \ldots 2\pi/4$,
salient pole $1_8 \ldots 3\pi/4$, Here, the salient poles $1_1$ and $1_5$, $1_2$ and $1_6$, $1_3$ and $1_7$, $1_4$ and $1_8$ are each in the same phases, and the eight poles $1_1, 1_2, \ldots 1_8$ are divided into four pairs in terms of phase.

The detent torque over the entire motor can be obtained by superimposing the detent torques generating at each salient pole $1_1, 1_2, \ldots, 1_8$, as the result of which, most of the higher harmonic wave is eliminated, and the portion remaining as the detent torque becomes only the higher harmonic wave component of fourth order and of its integral multiple. In view of the fact that as the order of each component is increased its amplitude is reduced, the order actually emerging as the detent torque is considered to be the fourth, and it is found that the cycle $\tau_D$ of the detent torque is equal to $\tau_R/4$.

Here, when the same study is made for a general case, if the number of sets of salient poles which differ in phase is assumed to be n, then the cycle $\tau_D$ of the detent torque is considered to equal $\tau_R/n$. Since this study is based only on the assumption that the arrangements of teeth for each salient pole are equal to each other and that the phase difference between the poles are even, even if the teeth pitch $\tau_S$ of each pole is changed, it suffers no influence as long as the same change is made for every pole.

Consequently, if, by changing the teeth pitch $\tau_S$, the detent torque of a cycle of $\tau_R/n$ is eliminated for each salient pole, then it can be eliminated over the entire motor.

Next, how the detent torque for each pole is eliminated is considered. From the foregoing study, it is found that the cycle $\tau_D$ of the detent torque to be eliminated is equal to $\tau_R/n$.

Let us assume that the number of teeth for each pole be k. Then, the detent torque generating for each pole can be decomposed for each tooth of that pole each having the same waveform.

Therefore, also in this case, the detent torque can be eliminated by offsetting the phase for superimposing. When k-sinusoidal waves of cycle $2\pi$ are superimposed for elimination, the phase difference between each other may be set to $2\pi/k$. Similarly, for the detent torque of cycle $\tau_R/n$, the offset angle for causing the phase difference of $2\pi/k$ results in $\tau_R/(n \times k)$.

In conclusion, in order to eliminate the detent torque, the teeth pitch $\tau_S$ of the stator may be set as follows:

$$\tau_S = \tau_R \{1 + 1/(n \times k)\} \quad (1)$$

$$\tau_S = \tau_R \{1 - 1/(n \times k)\} \quad (2)$$

As apparent from the foregoing description, according to the stepping motor of the present invention, since the teeth of the stator are disposed so that their pitch assumes a predetermined relationship resulting from the entire arrangement of the stepping motor including the teeth of the rotor, the detent torque of the motor can be eliminated.

Consequently, it is possible to provide a stepping motor which may achieve a smooth rotational movement while being also suitable for a microstep system.

In addition, if the pitch of the stator teeth is made smaller than that of the rotor to increase the number of teeth for each pole of the stator, then the driving torque can be increased.

DETAILED DESCRIPTION OF THE PREFERRED EMBODIMENTS

Several preferred embodiments according to the present invention are hereinafter described in detail by way of example with reference to the accompanying drawings.

First Embodiment

Figure 2:
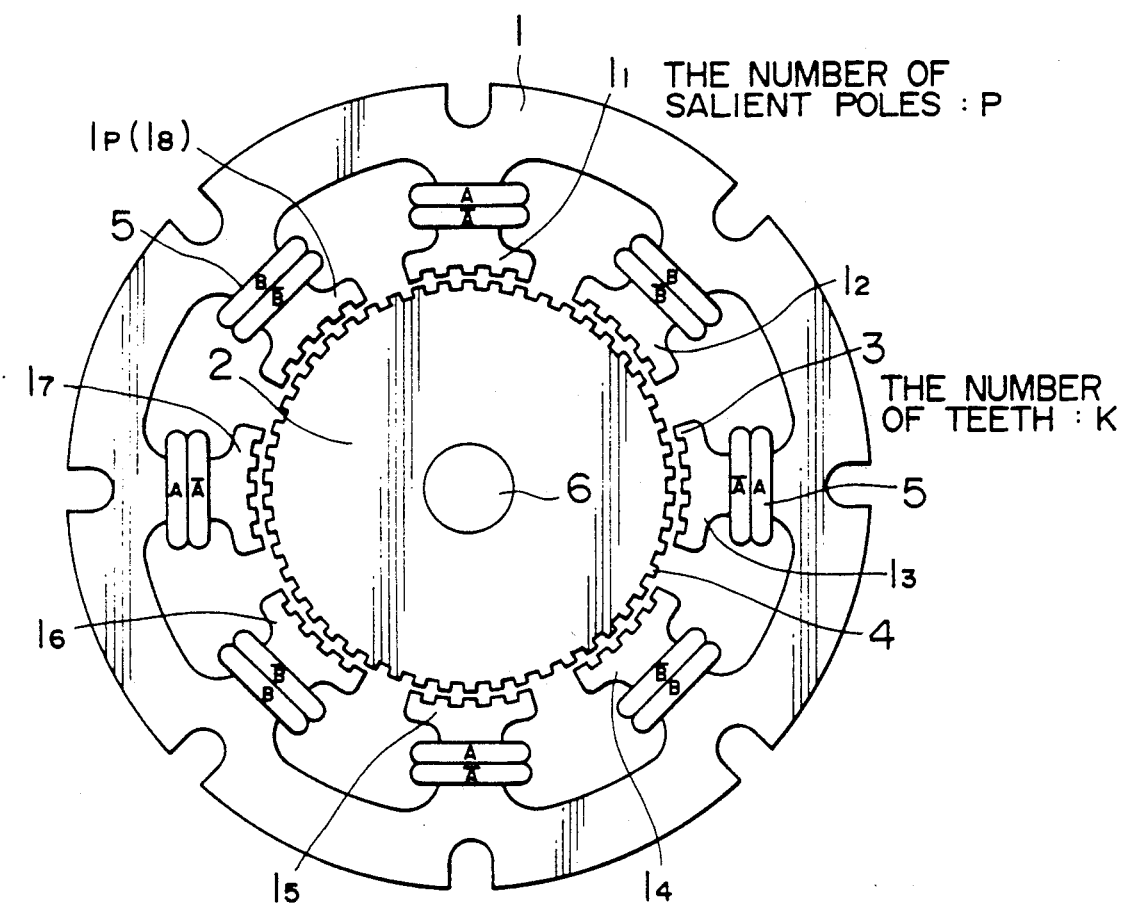
FIG. 2 is a cross-sectional view illustrating a mutual relationship between the stator and the rotor according to a first embodiment of the stepping motor of the present invention.

FIG. 2 is a cross-sectional view illustrating a mutual relationship between the stator and the rotor according to a first embodiment of the present invention, in which P (eight in the figure) salient poles $1_1, 1_2, \ldots 1_P$ are each disposed at equal pitch angles at the side of a stator 1 while on the surface of each pole opposed to a rotor 2, k (five in the figure) stator teeth 3 are each disposed at equal pitches $\tau_S$ and, also at the side of the rotor 2, a plurality of (fifty in the figure) rotor teeth 4 is disposed at equal pitches $\tau_R$.

Now, if a two phase stepping motor with P=8 salient poles of the stator, n=4 sets of poles each differing in phase (their phase differences are the same), k=5 teeth for each pole and the pitch $\tau_R = 7.2$ degrees of the rotor teeth is used, the pitch $\tau_S$ of the stator teeth necessary to eliminate the detent torque results in the following:

$$\tau_S = \tau_R \times \{1 + 1/(n \times k)\} = 7.2 \times \{1 + 1/(4 \times 5)\} = 7.56$$
(degrees)

Figure 1:
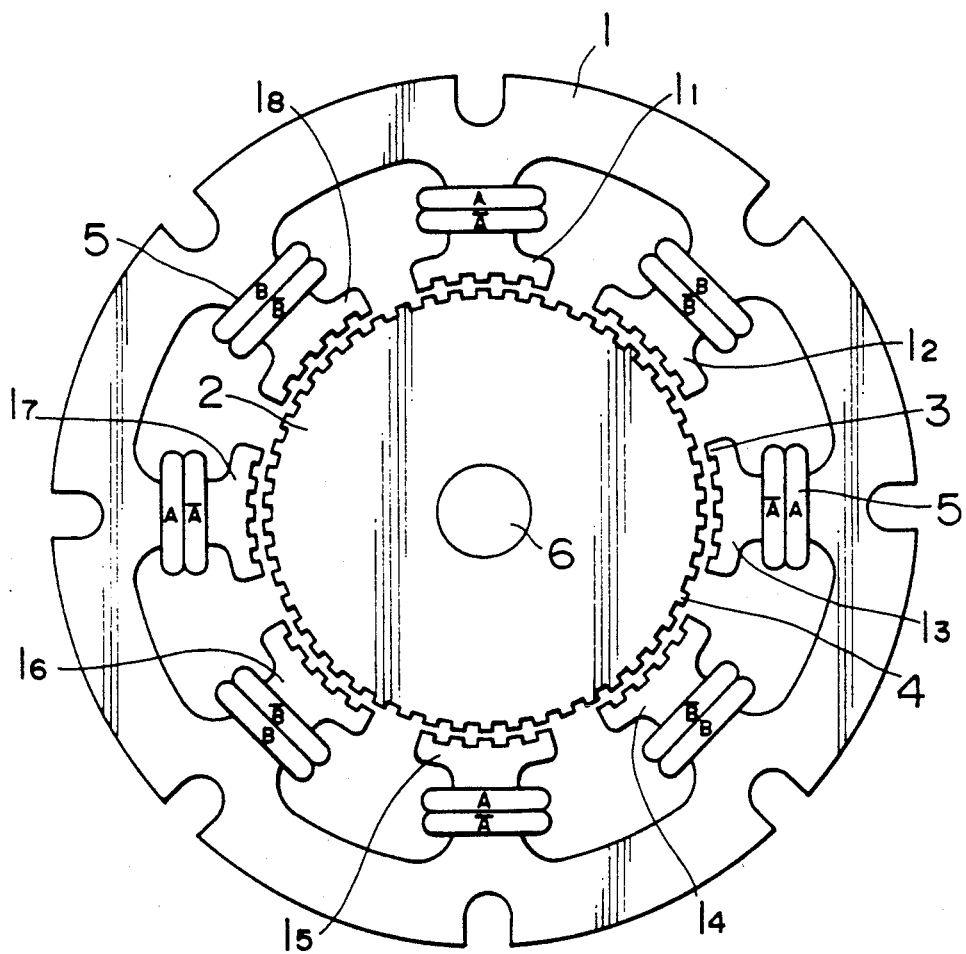
FIG. 1 is a cross-sectional view illustrating a mutual relationship between the stator and the rotor, which serves to reveal the operation of the present invention.

Since the permissible range taking the foregoing $\tau_S = 7.56$ degrees as its center value practically causes no trouble up to about 5% of the detent torque when both teeth pitches $\tau_S$ and $\tau_R$ of FIG. 1 equal 7.2 degrees respectively, the pitch $\tau_S$ of the stator can be calculated as follows:

$$7.532° \leq \tau_S \leq 7.588°$$

Second Embodiment

Figure 3:
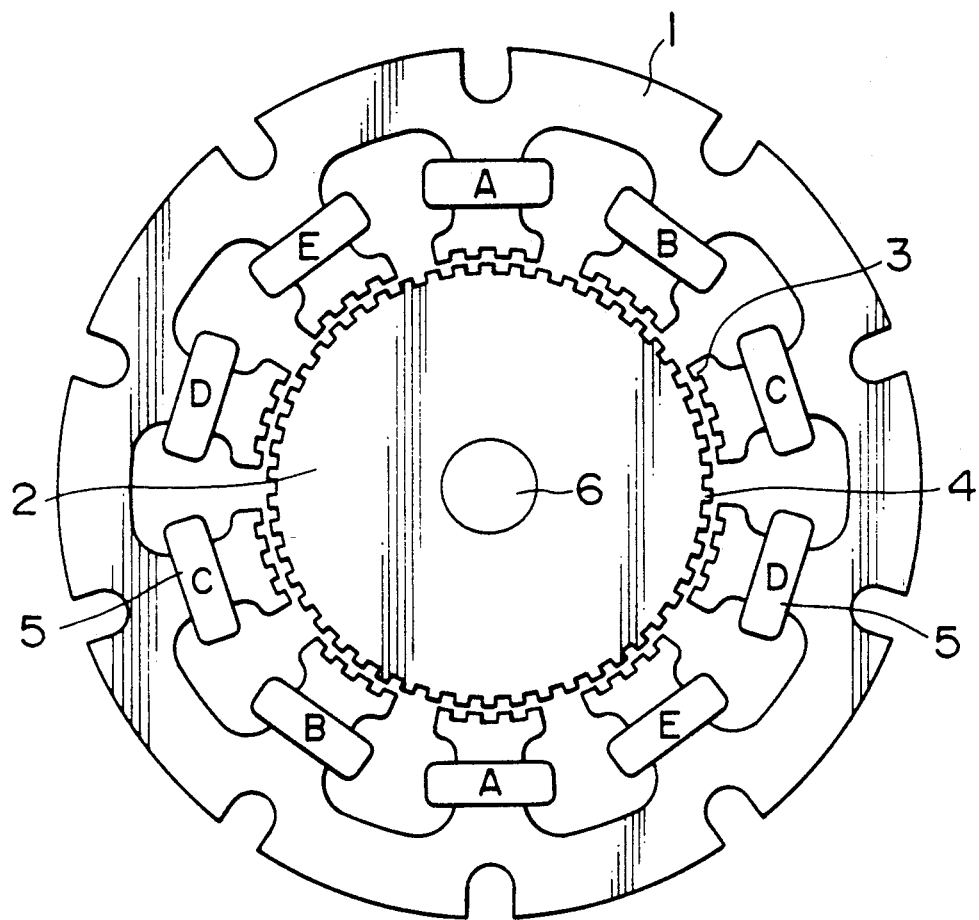
FIG. 3 is a cross-sectional view illustrating a mutual relationship between the rotor and the stator according to a second embodiment of the present invention.

FIG. 3 is a cross-sectional view illustrating a mutual relationship between the stator and the rotor according to a second embodiment of the present invention.

In the same figure, if a five phase stepping motor with P=10 salient poles of the stator, n=5 sets of the poles each differing in phase (their phase difference is the same), k=4 teeth for each pole and the pitch $\tau_R = 7.2$ degrees of the rotor teeth is used, then the pitch $\tau_S$ of the stator teeth which is necessary to eliminate the detent torque can be calculated as follows from the equation (1) and the permissible range of the foregoing embodiment:

$$7.544° \leq \tau_S \leq 7.576°$$

Third Embodiment

Figure 4:
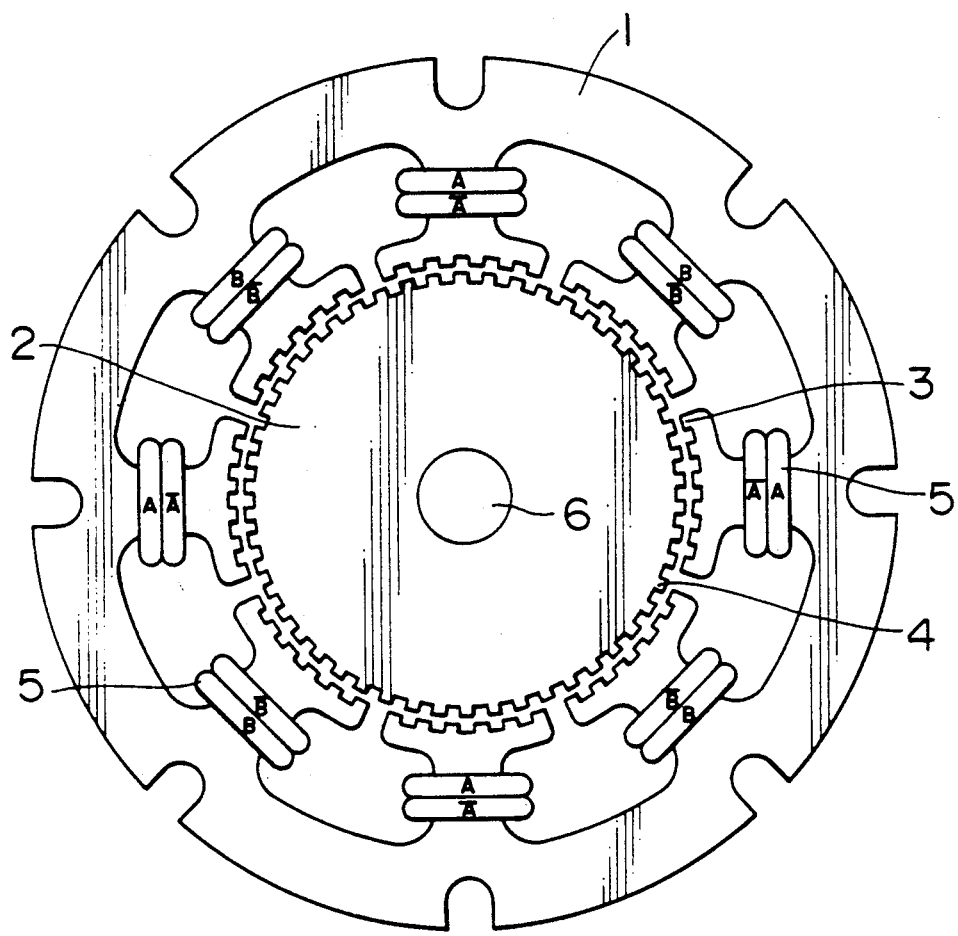
FIG. 4 is a cross-sectional view illustrating a mutual relationship between the stator and the rotor according to a third embodiment of the present invention.

FIG. 4 is a cross-sectional view illustrating a mutual relationship between the stator and the rotor according to a third embodiment of the present invention.

In the same figure, if a two phase stepping motor with P=8 salient poles of the stator, n=4 sets of the poles each differing in phase (the phase difference is the same), k=6 teeth for each pole and the pitch $\tau_R=7.2$ degrees of the rotor teeth is used, then the pitch $\tau_S$ of the stator teeth which is necessary to eliminate the detent torque can be calculated as follows from the permissible range of the foregoing embodiment by utilizing the equation (2) in order to add the number of the teeth by one:

$$6.887° \leq \tau_S \leq 6.913°$$

In this embodiment, since the number of the stator teeth 3 can be increased by one, the amount of magnetic flux which passes through the teeth 3 of each pole of the stator 1 is increased so that the driving torque can be increased as a whole.

Fourth Embodiment

Figure 5:
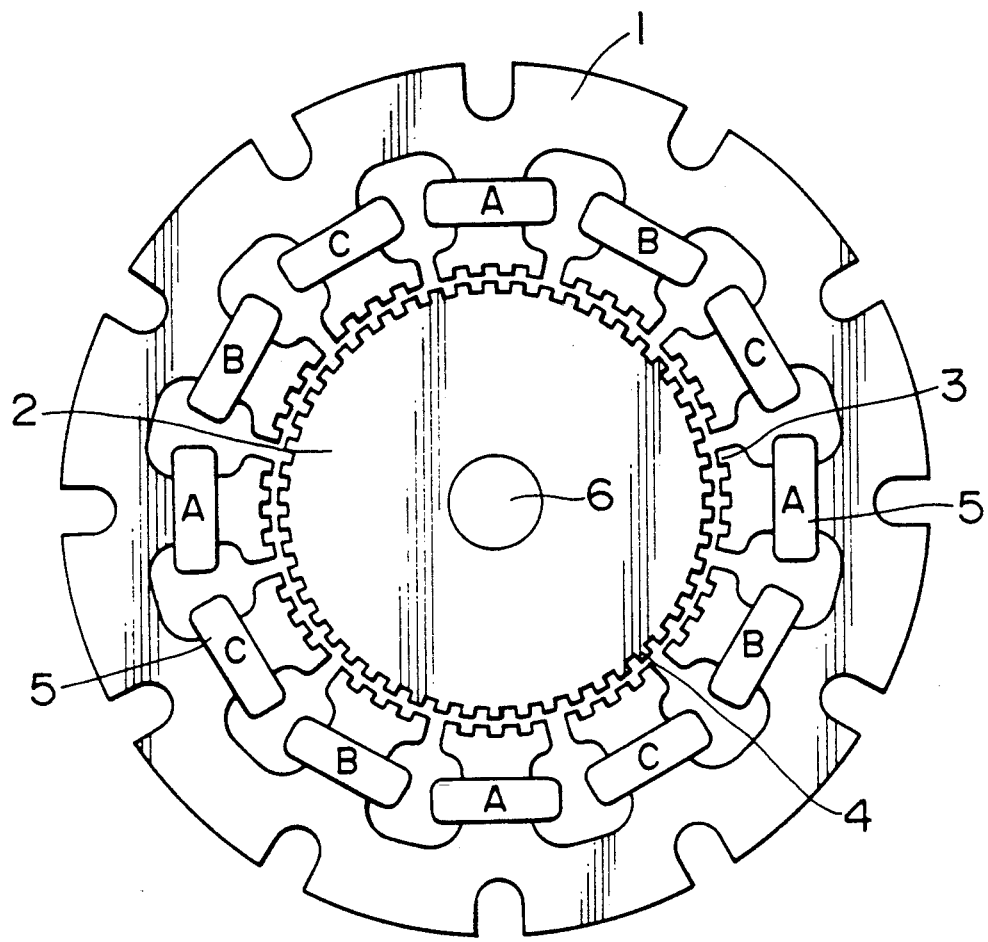
FIG. 5 is a cross-sectional view between the stator and the rotor according to a fourth embodiment of the present invention.
Figure 6:
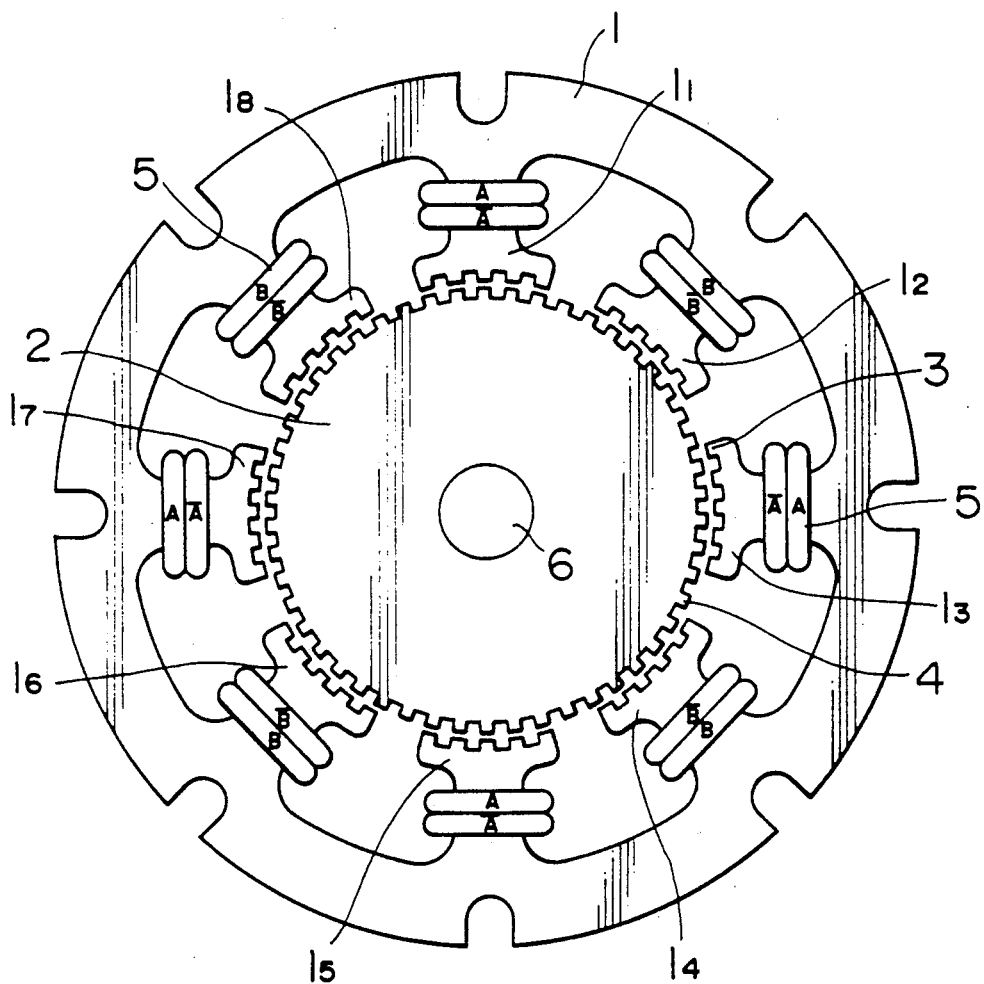
FIG. 6 is a cross-sectional view illustrating a mutual relationship between the stator and the rotor according to a conventional stepping motor.

FIG. 5 is a cross-sectional view representing a mutual relationship between the stator and the rotor according to a fourth embodiment of the present invention.

In the same figure, if a three phase stepping motor with P=12 salient poles of the stator, n=6 sets of the poles each differing in phase (their phase difference is the same), k=4 teeth for each pole and the pitch $\tau_S=7.2$ degrees of the rotor teeth is used, then the pitch $\tau_S$ of the stator teeth which is necessary to eliminate the detent torque can be calculated as follows from the permissible range of the foregoing embodiment by utilizing the equation (2) in order to increase its teeth number by one:

$$6.887° \leq \tau_S \pm 6.913°$$

The present invention is not necessarily restricted to the foregoing embodiments, but may be practiced by other alternative embodiments which may perform the similar function. In addition, various changes and modifications may be added thereto within the scope of the foregoing arrangement.

What is claimed is:

1. In a stepping motor having a stator and rotor, said stator having a number P of salient poles facing said rotor and in which each stator has a number of teeth k each disposed on a surface of a salient pole at equal pitches $\tau_S$, said rotor having a number of teeth each disposed at equal pitches $\tau_R$ the improvement comprising that said P stator salient poles comprise n sets of poles each differing in phase and that said stator teeth are each disposed so that their pitch $\tau_S=\tau_R\times\{1\pm1/(n\times k)\}$, wherein n, P and k are integers, so as to eliminate the detent torque.

2. In a stepping motor as set forth in claim 1 wherein when said motor is a two phase stepping motor with P=8 salient poles of said stator, n=4 sets of poles, k=5 teeth for each pole and $\tau_R=7.2$ degrees, and wherein $\tau_S$ is defined by the following range: 7.532 degrees$\leq\tau_S\leq$7.588 degrees.

3. A stepping motor as set forth in claim 1 wherein said motor is a five phase stepping motor with P=10 salient poles of said stator, n=5 sets of the poles, k=4 teeth for each pole and $\tau_R=7.2$ degrees, and wherein $\tau_S$ is defined by the following range: 7.544 degrees$\leq\tau_S\leq$7.576 degrees.

4. A stepping motor as set forth in claim 1 wherein said stator teeth are each disposed so that their pitch $\tau_S=\tau_R\times\{1-1/(n\times k)\}$ in order to increase the number of teeth for each salient pole so as to increase the driving torque.

5. A stepping motor as set forth in claim 4 wherein said motor is a two phase stepping motor with P=8 salient poles of the stator, N=4 of the poles, k=6 teeth for each pole and $\tau_R=7.2$ degrees, and wherein $\tau_S$ is defined by the following range: 6.887 degrees$\leq\tau_S\leq$6.913 degrees.

6. A stepping motor as set forth in claim 4 wherein said motor is a three phase stepping motor with P=12 salient poles of the stator, n=6 {pairs} sets of the poles, k=4 teeth for each pole and $\tau_R=7.2$ degrees, and wherein $\tau_S$ is defined by the following range: 6.887 degrees$\leq\tau_S\leq$6.913 degrees.

* * * * *